March 27, 1934.   O. J. HORGER   1,952,710
ROLLER BEARING RAILWAY CAR AXLE MOUNTING
Filed April 27, 1931   3 Sheets-Sheet 1
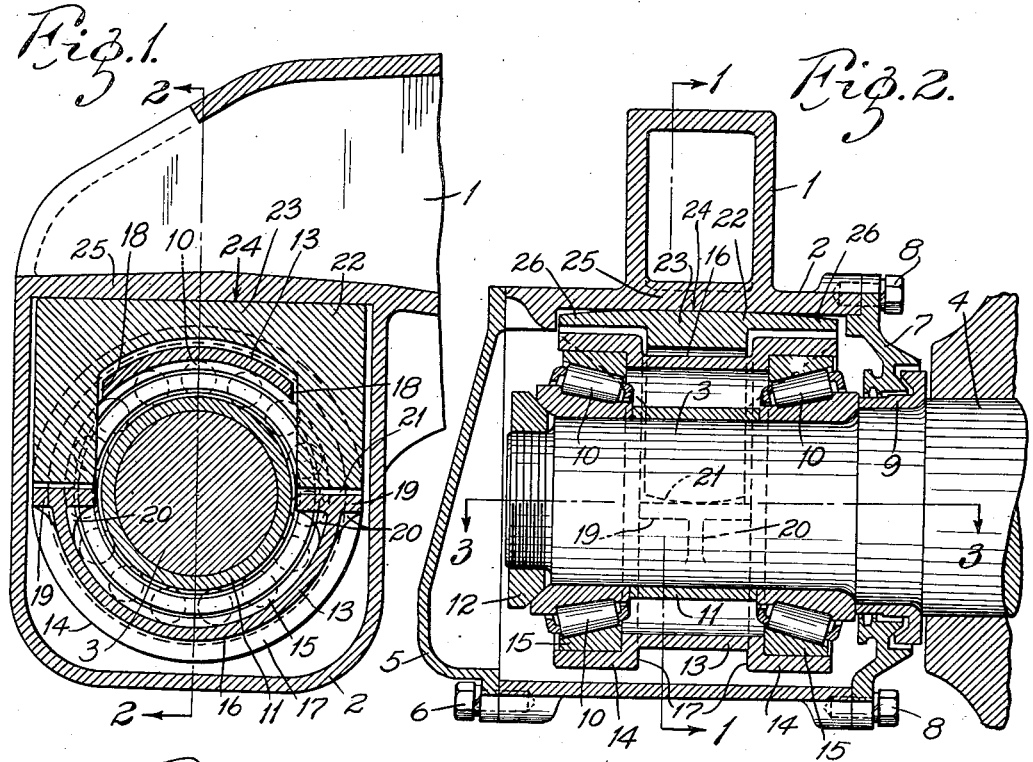
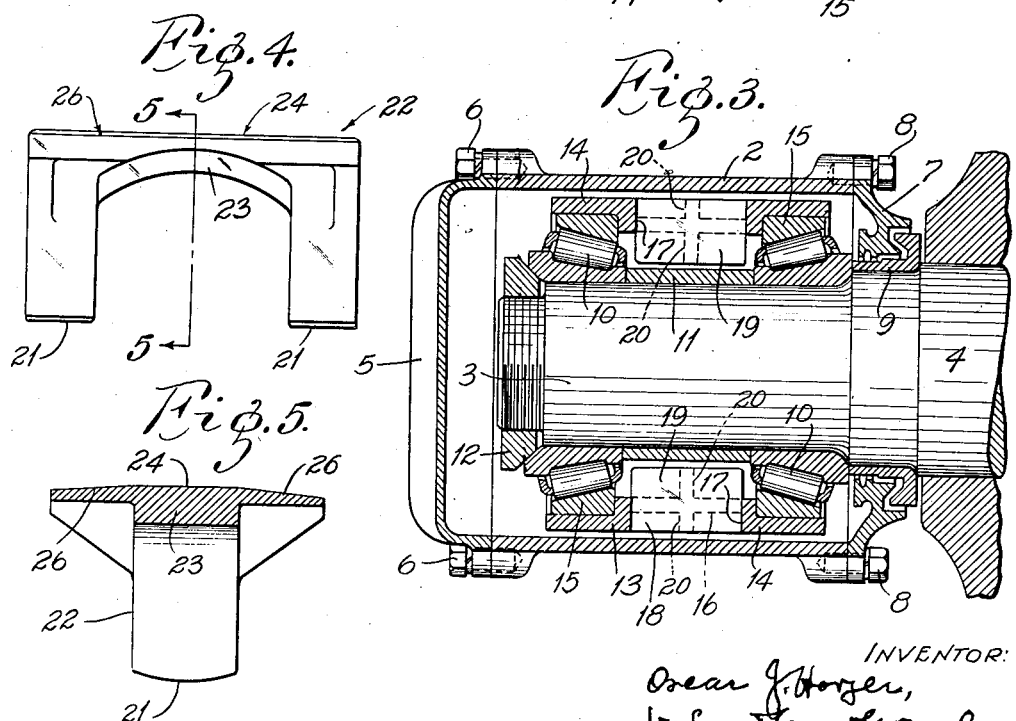
INVENTOR:
Oscar J. Horger,
by Candlan & Gravely
HIS ATTORNEYS.

March 27, 1934.   O. J. HORGER   1,952,710
ROLLER BEARING RAILWAY CAR AXLE MOUNTING
Filed April 27, 1931   3 Sheets-Sheet 2
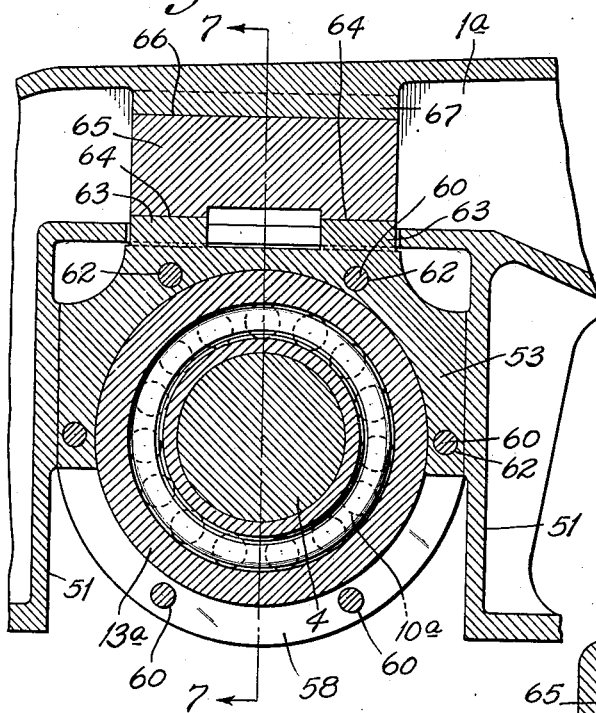
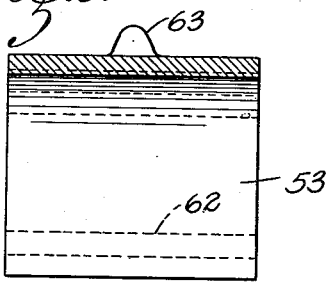
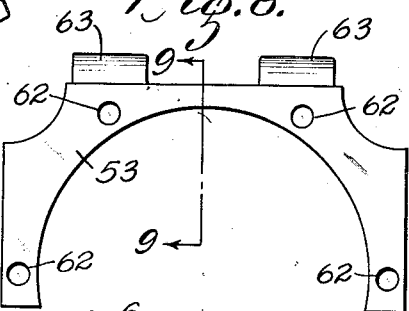
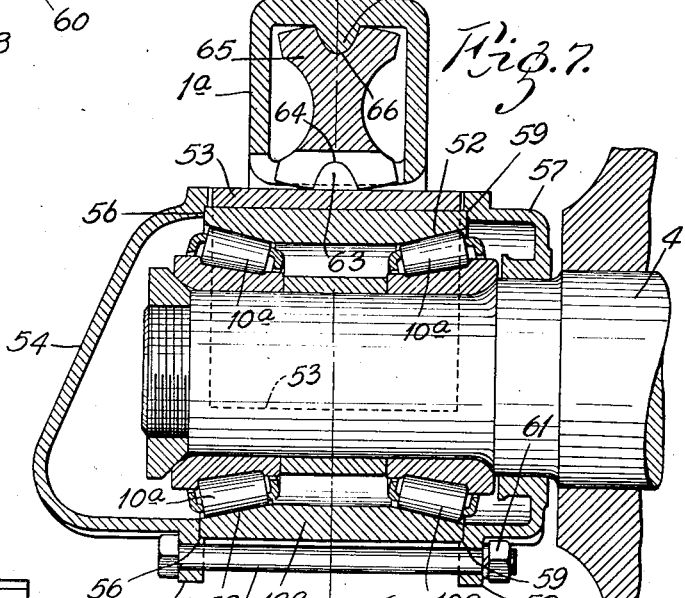
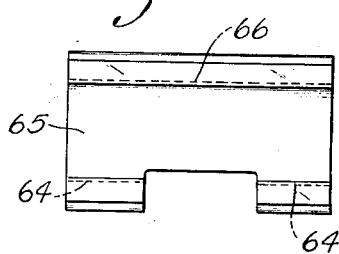
INVENTOR.
Oscar J. Horger,
by Cushman Gravely
HIS ATTORNEYS March 27, 1934.  O. J. HORGER  1,952,710
ROLLER BEARING RAILWAY CAR AXLE MOUNTING
Filed April 27, 1931  3 Sheets-Sheet 3
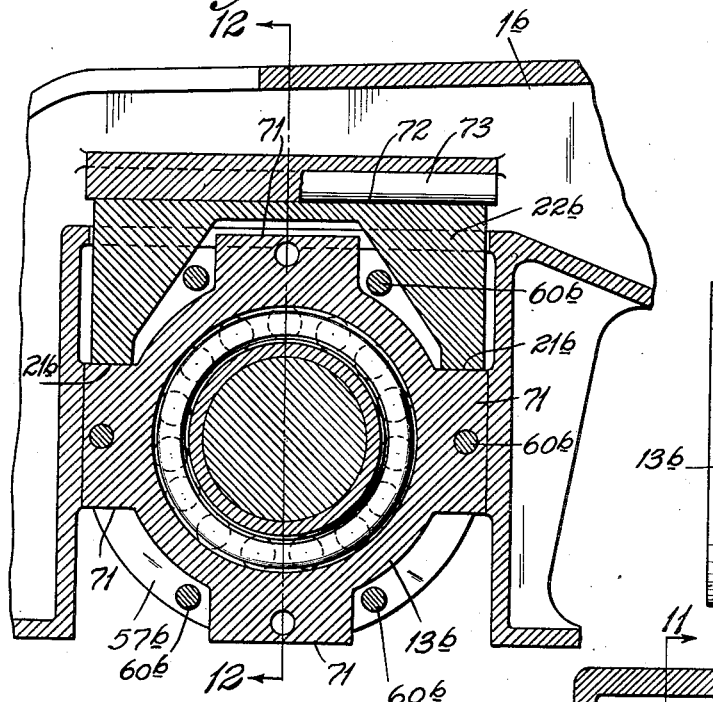
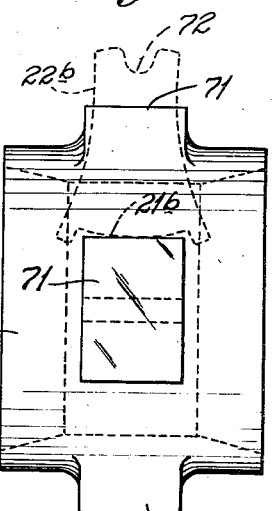
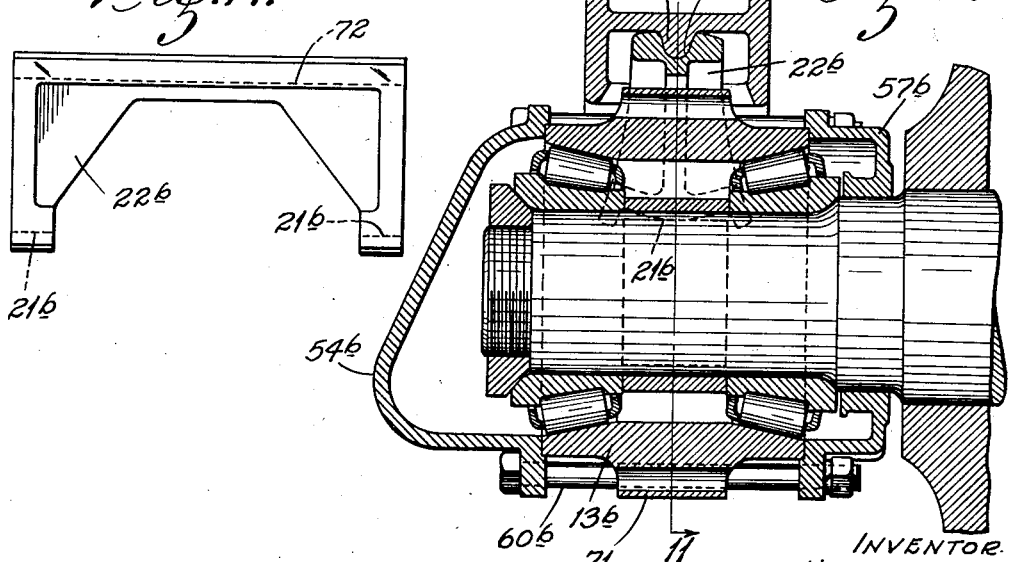
INVENTOR
Oscar J. Horger,
by Cam Flan & Gravely.
HIS ATTORNEY Patented Mar. 27, 1934

1,952,710

UNITED STATES PATENT OFFICE 1,952,710

ROLLER BEARING RAILWAY CAR AXLE MOUNTING

Oscar J. Horger, Canton, Ohio, assignor to The Timken Roller Bearing Company, Canton, Ohio, a corporation of Ohio Application April 27, 1931, Serial No. 533,145

4 Claims. (Cl. 105—223)

My invention relates to railway car axle constructions provided with roller bearings and has for its principal object a construction that maintains the proper position of the bearings on the axle, preventing relative skewing or canting movement between said members and that, at the same time, permits relative movement as between the axle and the truck side frame. The invention has for further objects, cheapness and simplicity of construction.

The invention consists principally in mounting the bearings in a tubular sleeve or carrier and in interposing rocker members between said carrier and the journal box or the truck side frame, the carrier properly positioning and holding the bearings on the axle and the rocker accommodating relative movement as between the axle and the truck side frame. The invention further consists in the roller bearing railway car axle mounting and in the parts and combinations and arrangements of parts hereinafter described and claimed.

In the accompanying drawings,

Fig. 1 is a sectional view through a roller bearing railway car axle mounting embodying my invention, the section being taken transversely of the axle on the line 1—1 in Fig. 2 looking in the direction of the arrows, Fig. 2 is a vertical sectional view taken longitudinally of the end of the axle, on the line 2—2 in Fig. 1 looking in the direction of the arrows, Fig. 3 is a horizontal sectional view taken on the line 3—3 in Fig. 2, looking in the direction of the arrows, Fig. 4 is a detail view of the rocker member in side elevation, Fig. 5 is a cross-sectional view on the line 5—5 in Fig. 4, Fig. 6 is a sectional view similar to Fig. 1 taken on the line 6—6 in Fig. 7, showing a modification, Fig. 7 is a vertical sectional view on the line 7—7 of Fig. 6, Fig. 8 is a detail view of a saddle member mounted on the bearing carrier and supporting a rocker member, Fig. 9 is a sectional view on the line 9—9 of Fig. 8, Fig. 10 is an elevation of the rocker member, Fig. 11 is a sectional view similar to Fig. 1 on the line 11—11 of Fig. 12, showing another modification, Fig. 12 is a sectional view on the line 12—12 of Fig. 11, Fig. 13 is a detail view of the bearing carrier and rocker member in side elevation; and Fig. 14 is an elevation of the rocker member.

In the construction shown in Figs. 1 to 5, each truck side frame 1 is provided at each end with an enlarged integral journal box portion 2 into which extends one end 3 of an axle 4. The outer end of the journal box portion 2 is closed by means of a cap 5 secured to the end of the journal box portion as by screws 6, and the inner end is closed by an annular member 7 secured to the journal box portion by screws 8 and closely encircling a guard ring 9 mounted on the axle.

Mounted on the axle are antifriction bearings, conical roller bearings 10 being illustrated. A spacer sleeve 11 is interposed between the bearings and a nut 12 is mounted on the end of the axle for securing the bearings in position. In the construction of Figs. 1 to 5, the bearings are mounted in a housing or carrier 13 comprising a tubular member having both end portions 14 provided with enlarged bores to receive separate cups 15 or outer bearing members for the roller bearings 10. The outside diameter of the end portions 14 of the carrier 13 is also larger than the outside diameter of the body portion of the carrier, so that a peripheral channel 16 is formed by the body and the inner faces 17 of said end portions 14.

The carrier 13 is provided with openings 18 in its sides and with a horizontally extending ledge 19 or double flange formed at the bottom of each opening. Stiffening ribs 20 are disposed beneath said ledge. Each ledge constitutes a seat for the rounded bottom of a rocker portion 21 at the end of a cradle 22 that fits over the upper portion of said carrier 13. Said cradle 22 has a thickened middle portion 23 projecting loosely into the channel 16 defined by the body portion of the carrier and the enlarged end portions thereof. Viewed transversely of the axle, the upper surface of said cradle 22 has a middle portion 24 that extends horizontally to make flatwise contact with the underside of the top 25 of the journal box 2. Viewed longitudinally of the axle, the portions 26 of the top of said cradle 22 on either side of the flat middle portion 24 taper toward the edges of the cradle.

The construction described permits endwise movement of the axle and bearing carriers in the journal box, such endwise movement being accommodated by the comparatively loose fit of the rocker portions 21 of the cradle 22 in the openings 18 and also by the capacity of the cradle itself for limited endwise movement. Canting or rocking of the axle 4 and bearing carriers 13 with respect to the truck side frame 1 is accommodated by means of the cradle or rocker member 22 interposed therebetween.

In the construction shown in Figs. 6 to 10, the truck side frame 1a is provided with depending pedestal or jaw portions 51 receiving the end of the axle 4. The bearing carrier 13a itself is provided with raceway portions 52 for the roller bearings 10a, separate outer bearing members being dispensed with. Mounted on the upper portion of the bearing carrier 13a is a saddle 53 concaved to fit said carrier, said saddle fitting snugly between the pedestal members 51. A separate journal box is dispensed with, the carrier being closed at each end to constitute a bearing housing. The outer end of the bearing carrier 13a is provided with a cap or cover 54 having a peripheral flange 55 in which is formed a seat 56 for the end of said bearing carrier 13a. The inner end of the bearing carrier 13a is closed by a washer member 57 having an annular end flange 58 provided with a seat 59 for the inner end of the bearing carrier 13a. The flanges 55 and 58 of said outer cover and inner closure member, respectively, overlap the saddle 53. Said flanges 55 and 58 are secured together by bolts 60 and nuts 61, a number of said bolts 60 extending through holes 62 provided therefor in said saddle 53.

The top of the saddle 53 is provided with a pair of spaced projections 63 adapted to fit in depressions 64 formed in the inner surface of a rocker member 65. The upper surface of said rocker member 65 is provided with an elongated groove 66 in which is disposed a rib 67 on the underside of the side frame.

In the modification shown in Figs. 11 to 14 the bearing carrier 13b is provided with two piars of diametrically opposed projections 71, one pair being disposed horizontally so that their upper surfaces constitute seats for the rocker portions 21b of a cradle member 22b. Said cradle member 22b is provided with a longitudinal groove 72 in its upper surface in which fits a rib 73 on the underside of a portion of the truck side frame 1b. The second pair of projections 71 permits turning of the bearing carrier so that wear thereon may be distributed. The ends of said carrier are closed by a cap 54b and a washer 57b secured together by through bolts 60b as in the case of the construction shown in Figs. 6 to 10.

The above described constructions properly position the roller bearings on the axle and still accommodate the necessary relative movement as between the axle and the truck side frame. If desired, the rockers shown in Figs. 6 to 14 may be made self-centering so as to always restore the parts to a normal position after movement has taken place. The constructions are easily usable in connection with truck side frames of the kind now used for plain bearings. Obviously numerous changes may be made without departing from the invention and I do not wish to be limited to the precise construction shown.

What I claim is:

1. A railway car axle construction comprising a truck side frame having an axle receiving portion, an axle extending thereinto, roller bearings on said axle, a bearing carrier for said bearings, the sides of said carrier being provided with flat seats, and a cradle member extending over the top of said bearing carrier and having depending portions whose lower ends are convexly curved to have rocking engagement with said seats, the top of said cradle member having extended engagement with a portion of said side frame, and being free to rock relative to said truck side frame.

2. A railway car truck frame construction having an integral journal box portion, an axle having its end portion disposed in said journal box portion, roller bearings on the end of said axle, a tubular carrier for said bearings, said carrier having recessed portions with flat seats in its sides and a cradle interposed between said carrier and said journal box portion, said cradle contacting at the top with a portion of said side frame and having rocker portions resting on said seats, said rocker portions being convexly curved.

3. A railway car truck frame construction having an integral journal box portion, an axle having its end portion disposed in said journal box portion, roller bearings on the end of said axle, a tubular carrier for said bearings, said carrier having lateral projections constituting flat seats and a cradle interposed between said carrier and said journal box portion, said cradle contacting at the top with a portion of said side frame and having rocker portions resting on said seats, said rocker portions being convexly curved.

4. A railway car axle construction comprising a truck side frame having an axle receiving portion, an axle extending thereinto, roller bearings on said axle, a bearing carrier for said bearings, said carrier having four equally spaced projections with flat surfaces, a cradle member extending over the top of said bearing carrier and having depending end portions with convexly curved bottoms seated on a diametrically opposed pair of said projections, the top of said cradle having rocking engagement with a portion of said side frame, closure members for the ends of said carrier and through bolts securing said closure members and said carrier together.

OSCAR J. HORGER.